(12) United States Patent
Mehnert et al.

(10) Patent No.: US 12,370,974 B2
(45) Date of Patent: Jul. 29, 2025

(54) GAS GENERATOR

(71) Applicant: ZF Airbag Germany GmbH, Aschau a. Inn (DE)

(72) Inventors: Bernhard Mehnert, Ebersberg (DE); Sebastian Bierwirth, Rechtmehring (DE); Karl Englbrecht, Erharting (DE); Johannes Ebner, Mühldorf a. Inn (DE); Vadim Kolbin, Munich (DE)

(73) Assignee: ZF AIRBAG GERMANY GMBH, Aschau am Inn (DE)

( * ) Notice: Subject to any disclaimer, the term of this patent is extended or adjusted under 35 U.S.C. 154(b) by 0 days.

(21) Appl. No.: 18/469,579

(22) Filed: Sep. 19, 2023

(65) Prior Publication Data
US 2024/0092308 A1 Mar. 21, 2024

(30) Foreign Application Priority Data
Sep. 20, 2022 (DE) ...................... 10 2022 124 029.0

(51) Int. Cl.
*B60R 21/261* (2011.01)
*B60R 21/26* (2011.01)
*B60R 21/264* (2006.01)

(52) U.S. Cl.
CPC ............ *B60R 21/261* (2013.01); *B60R 21/26* (2013.01); *B60R 21/264* (2013.01); *B60R 2021/26011* (2013.01)

(58) Field of Classification Search
CPC ..... B60R 21/261; B60R 21/26; B60R 21/264; B60R 2021/26011; B60R 21/2644
See application file for complete search history.

(56) References Cited

U.S. PATENT DOCUMENTS

| | | | | | |
|---|---|---|---|---|---|
| 4,865,635 | A | * | 9/1989 | Cuevas | B01D 39/2068 55/487 |
| 5,100,171 | A | * | 3/1992 | Faigle | B60R 21/2644 280/736 |
| 5,224,734 | A | * | 7/1993 | Swiderski | B60R 21/2644 422/305 |
| 5,466,420 | A | * | 11/1995 | Parker | B60R 21/2644 422/165 |

(Continued)

FOREIGN PATENT DOCUMENTS

| | | |
|---|---|---|
| DE | 19709597 A1 | 8/1997 |
| DE | 102005051167 A1 | 5/2006 |

(Continued)

OTHER PUBLICATIONS

Iwai et al., Inflator, Dec. 18, 2003, WO 03/104045 A1, Machine Translation of Description (Year: 2003).*

(Continued)

*Primary Examiner* — Paul N Dickson
*Assistant Examiner* — Shams Dhanani
(74) *Attorney, Agent, or Firm* — Tarolli, Sundheim, Covell & Tummino LLP

(57) ABSTRACT

A gas generator (10) comprises a housing (12) in which a conical combustion chamber screen (52) terminates the combustion chamber (44). On the front side, the combustion chamber screen (52) is closed by an end cap (54) to which a filter element (60) is connected which has one or more axially projecting centering extensions (64) on the edge of the filter bottom (62).

18 Claims, 2 Drawing Sheets

(56) References Cited

U.S. PATENT DOCUMENTS

Figure 1:
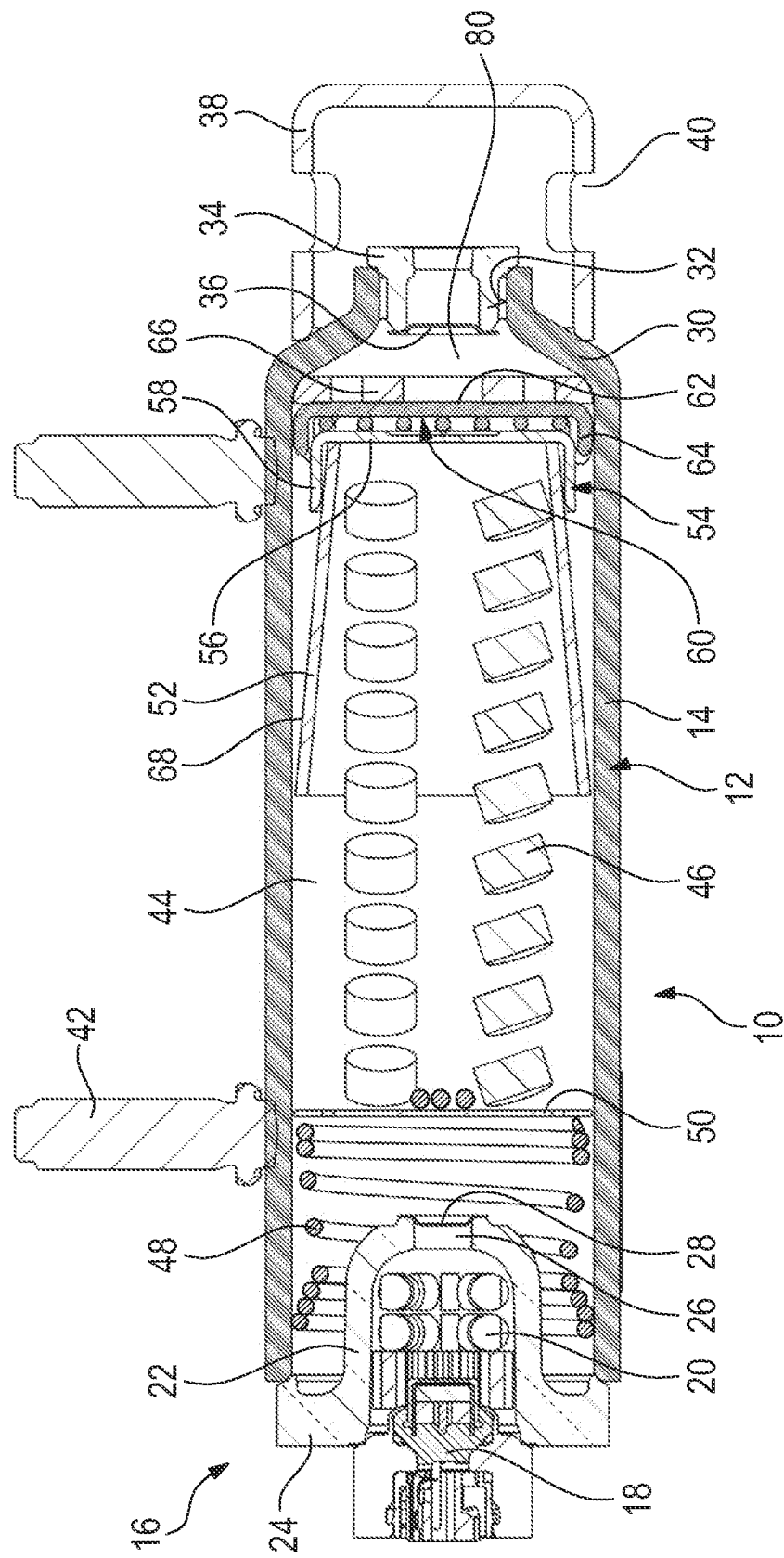

| | | | | |
|---|---|---|---|---|
| 5,585,597 | A | * | 12/1996 | Faigle ..................... C06D 5/06 |
| | | | | 102/288 |
| 5,611,566 | A | * | 3/1997 | Simon ................. B60R 21/2644 |
| | | | | 280/736 |
| 5,845,934 | A | * | 12/1998 | Armstrong, III ... B60R 21/2644 |
| | | | | 280/736 |
| 8,573,644 | B1 | * | 11/2013 | Mayville ............... B60R 21/261 |
| | | | | 280/741 |
| 11,155,234 | B2 | * | 10/2021 | Bierwirth ............ B60R 21/2644 |
| 2008/0143088 | A1 | * | 6/2008 | Yamazaki ........... B60R 21/2644 |
| | | | | 280/739 |
| 2017/0028964 | A1 | * | 2/2017 | Bierwirth ................ B60R 21/26 |
| 2019/0351863 | A1 | * | 11/2019 | Ramp ................... B60R 21/272 |
| 2022/0194314 | A1 | * | 6/2022 | Danielou ............. B01D 46/001 |
| 2023/0079105 | A1 | * | 3/2023 | Englbrecht ......... B60R 21/2644 |
| | | | | 280/736 |

FOREIGN PATENT DOCUMENTS

| | | | |
|---|---|---|---|
| DE | 102016123312 A1 | 6/2018 | |
| DE | 102018126277 A1 | 4/2020 | |
| JP | 2016196263 A | 11/2016 | |
| WO | WO-03104045 A1 * | 12/2003 | ............. B60R 21/26 |
| WO | 2023/047915 A1 | 3/2023 | |

OTHER PUBLICATIONS

German Search Report for corresponding German Application Serial No. 10 2022 124 029.0, dated Jun. 16, 2023, pp. 1-2.

* cited by examiner

GAS GENERATOR

RELATED APPLICATIONS

This application claims priority from German Patent Application DE 10 2022 124 029.0, filed 20 Sep. 2022, the entirety of which is hereby incorporated herein by reference.

The invention relates to a gas generator.

Gas generators of this type are used specifically for vehicle safety systems, wherein the use thereof is not limited thereto.

It is known that gas generators comprise combustion chamber screens. They serve in particular to withhold slag or fuel particles which are formed when the gas generator is activated and can be transported in a gas flow of combustion gas formed inside the housing of the gas generator. Combustion chamber screens known from prior art can be flown through unevenly, however, so that an uneven filter effect can occur when slag or fuel particles are retained.

DE 10 2016 123 312 A1 therefore suggests to design the combustion chamber screen as a conical member that tapers toward the diffuser-side end. As a result, an annular space is formed between the inside of a housing wall and the outside of the combustion chamber screen through which the filtered combustion gas flows towards the diffuser. As the combustion chamber screen is open at opposite axial ends, i.e., on the front side, an end cap closing the diffuser-side end must be provided for the throughflow. In prior art, said end cap includes a peripheral edge projecting from the bottom with radially outwardly bent tabs which serve for centering the end cap and the combustion chamber screen protruding into the end cap.

It is the object of the invention to impart an even simpler and fluidically more optimized design to said known gas generator.

This object is achieved by a gas generator comprising a housing, an ignition unit with an igniter, a combustion chamber filled with pyrotechnical fuel, a diffuser downstream of the combustion chamber and having at least one outflow opening, a combustion chamber screen provided in the combustion chamber at the diffuser-side end thereof which combustion chamber screen has a diffuser-side end and an igniter-side axially opposed end and is, particularly conically, tapered from the igniter-side end to the diffuser-side end, the two opposed ends being open, wherein the diffuser-side end of the combustion chamber screen is laterally spaced apart from a housing wall while a particularly fuel-free annular space is formed, an end cap connected to the front side of the diffuser-side end of the combustion chamber screen and closing the diffuser-side end of the combustion chamber screen, which end cap has a bottom and a peripheral edge projecting from the bottom which is disposed on the outside of the diffuser, a pot-shaped filter element having a filter bottom and at least one centering extension projecting axially from the edge of the filter bottom for centering the filter element within the housing.

The gas generator according to the invention makes use of the filter element for centering by the filter element including at least one axially projecting centering extension. The previous filter elements have been simple disks. In this way, the tabs at the end cap can be omitted. Consequently, the end cap can be manufactured significantly more easily, and, in addition, no tabs impairing the flow guidance are provided.

The gas generator may further comprise a support member on which the filter bottom abuts and which supports the filter element, the end cap and the diffuser in the direction of outflow.

The housing may have a step, in particular in the form of, e.g., a cone-shaped taper, toward the diffuser. The support member abuts on said step. Thus, no further fasteners are required for the support member.

An intermediate chamber via which the filtered combustion gas reaches the diffuser is formed between the support member and the taper.

The support member is in particular a disk made of metal provided with flow orifices the bending stiffness of which is higher than that of the end cap and the filter element. Due to the pressure occurring and the flow occurring when the pyrotechnical fuel is burnt, the end cap and the filter element thus cannot bend so strongly that they bulge into the intermediate chamber. Hence, the paths for the filtered combustion gas remain predeterminable and sufficiently large in cross-section.

One variant of the invention provides the housing to be closed by a bursting membrane axially spaced apart from the support member. The diffuser thus can be arranged on the housing as a separate member, similarly to a cap.

The bursting membrane is secured either to the housing itself or to a membrane holder. Said membrane holder is a type of sleeve, for example, which is inserted into and secured in a front-side opening of the housing. The centrical opening of said sleeve is closed by the bursting membrane.

The support member abuts particularly laterally on the housing so as to be centered within the housing.

According to one variant of the invention, fuel pellets and a mechanical biasing device are disposed in the combustion chamber. Said biasing device serves to bias the fuel pellets towards the diffuser so that they cannot move relative to one another and rub against one another during driving operation throughout many years. The biasing device also helps increase the density of the fuel charge.

If the biasing device comprises a disk extending transversely to the longitudinal extension of the combustion chamber and being movable within the combustion chamber as well as a coil spring biasing the disk, it can be designed in a very simple and cost-efficient manner. The disk is provided with numerous openings to allow hot gas and hot particles introduced by the igniter to pass to the pyrotechnical fuel.

It has turned out that a coil spring of double taper shape, i.e., having a tapered central portion (central portion relating to the axial extension), has a very advantageous spring characteristic for the afore-mentioned purposes.

The coil spring may remain axially spaced apart from the igniter-side end of the housing and may be axially held on the housing by a radial press-fit in this area. That means that the coil spring does not bear axially against the housing or an end wall or the ignition unit at its end opposed to the disk, but is secured in the housing merely by press-fit. This facilitates the insertion of the ignition unit, in particular when the latter is designed as an end wall having a bulge protruding into the interior of the housing for accommodating the igniter. In that case, insertion of the ignition unit into the housing has no impact upon the coil spring.

The gas generator is particularly a tubular gas generator having a cylindrical elongate housing. At an axial end of the housing the ignition unit is provided and at the opposite end the diffusor is provided. The housing particularly takes a circular-cylindrical shape and is provided with an equal cross-section in the area of the combustion chamber, preferably up to the ignition unit.

The filter element can be designed in different ways. It may be made of wire mesh, of knitted wire mesh or of expanded metal. An alternative to this is a grid formed by overlapping wire sections extending transversely to each other. Said wire sections are configured to extend in two planes, for example, wherein for each plane wire sections extending in parallel are provided and the wire sections of the planes are aligned, compared to each other, at right angles so that a grid is resulting, when viewed in the axial direction.

The at least one centering extension may be a closed circumferential wall. Said wall merges integrally into the filter bottom. For example, the wall is produced by plastically forming a disk of wire mesh or knitted wire mesh or expanded metal or the afore-mentioned grid. As an alternative, plural centering extensions are provided. They consist of wire sections bent vis-à-vis the bottom. Thus, individual wire sections axially protrude from the filter bottom, whereby they provide minimum flow resistance to the combustion gas.

The end cap may be delimited laterally to the outside by the peripheral edge, i.e., it may not have any projecting flaps. It is centered laterally in the filter element via the at least one centering extension by said peripheral edge. That means that the end cap protrudes into the filter element so as to be centered. The centering extension of the filter element thus serves not only to center the filter element itself, but also serves as a lateral stop and, thus, as a centering means for the end cap.

Preferably, no flow can pass through the end cap, hence it is a part having no flow orifices.

Figure 2:
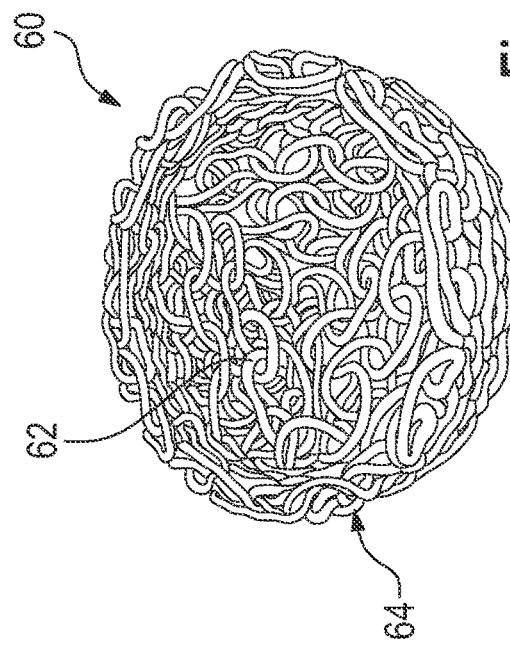
Figure 3:
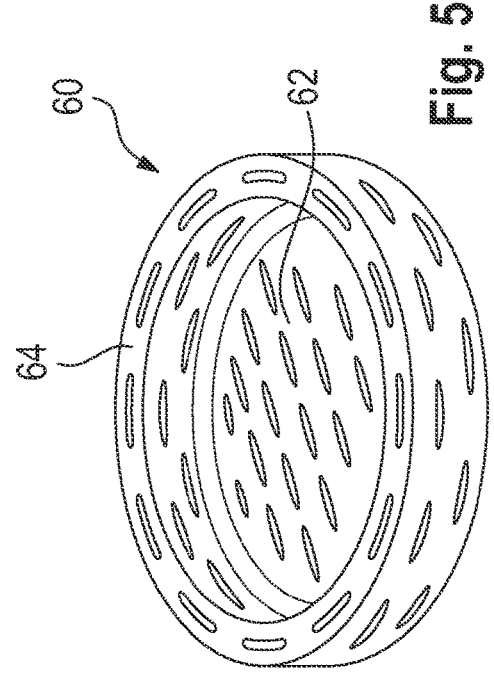
Figure 4:
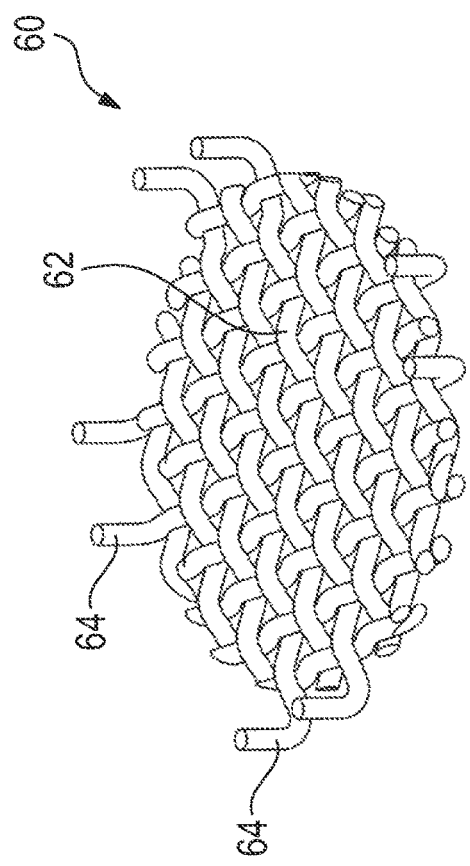
Figure 5:
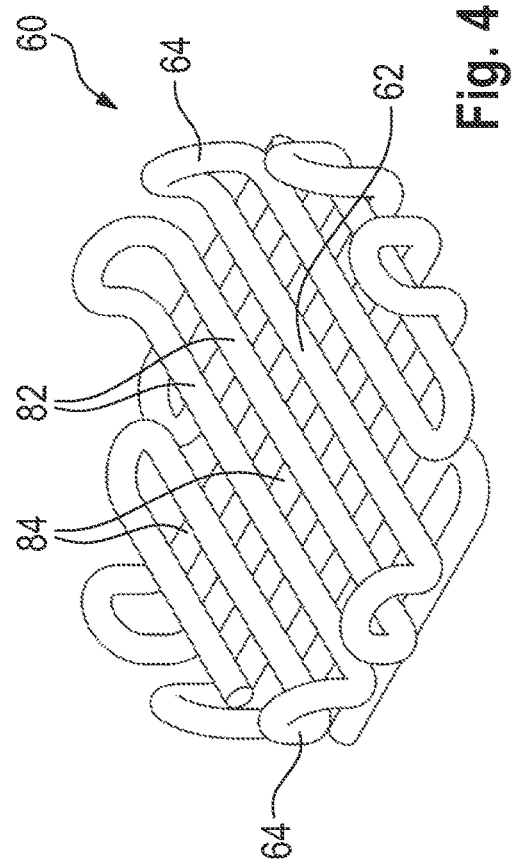

Further features and advantages of the invention will be evident from the following description and from the following drawings which will be referred to, and in which:

FIG. 1 shows an embodiment of the gas generator according to the invention which is understood to be not limiting, FIG. 2 shows a first variant of the filter element used in the invention, FIG. 3 shows a second variant of the filter element used in the invention, FIG. 4 shows a third variant of the filter element used in the invention, and FIG. 5 shows a fourth variant of the filter element used in the invention.

FIG. 1 illustrates a gas generator 10, in this case in the form of a tubular gas generator, which has an elongate housing 12 in the form of a circular-cylindrical tube. The housing 12 is defined by a housing wall 14.

The housing 12 is closed, at an axial end thereof, by an ignition unit 16 in which an igniter 18 and a booster charge 20 are accommodated.

The ignition unit 16 includes an integral pot-shaped housing 22 with a projecting flange 24 which is secured, specifically by welding, to an igniter-side end of the housing 12. A centrical intake opening 26 of the housing 22 is closed by a bursting membrane 28.

The opposite end of the housing 12 includes a step 30 formed by a taper. A centrical opening 32 is closed by a membrane holder 34 supporting a bursting membrane 36.

The membrane holder 34 is surrounded by a diffuser 38 which includes outflow openings 40 evenly distributed along the periphery.

Bolts 42 secured to the outside of the housing 12 serve for securing the gas generator 10 within the vehicle.

Inside the housing 12 a combustion chamber 44 is formed in which fuel is accommodated in the form of fuel pellets 46. Said fuel filling is mechanically biased by a biasing device including a double-taper coil spring 48 that urges against a disk 50 provided with openings and axially movable in the housing 12 on which disk 50 in turn the fuel pellets 46 abut.

The coil spring 48 is axially held at its igniter-side end by a radial press-fit in the housing 12, i.e., it is spaced apart from the flange 24.

As is evident from FIG. 1, the ignition unit 16 protrudes into the coil spring 48.

The combustion chamber 44 is delimited at the diffuser-side end thereof, inter alia, by a combustion chamber screen 52. Said combustion chamber screen 52, which is also axially aligned and is arranged to be centered in the interior of the housing 12, has an igniter-side end of larger cross-section and a diffuser-side end of smaller cross-section. Thus, the combustion chamber screen 52 tapers toward the diffuser-side end, with the taper being preferably conical.

The combustion chamber screen 52 is formed particularly by a perforated sheet.

At both of its axial ends, the combustion chamber screen 52 is open, but toward the diffuser it is closed by an end cap 54 directly adjacent thereto. The end cap 54 includes a bottom 56 and a peripheral edge 58 projecting from the bottom toward the igniter-side end.

The peripheral edge 58 defines the outer end of the end cap 54, i.e., there are no flaps or tabs projecting radially outwardly. The peripheral edge 58 is spaced radially apart, over the entire periphery, from the inside of the housing 12.

However, the combustion chamber screen 52 abuts on the inside of the peripheral edge 58. These two parts need not be welded, soldered or otherwise fixed to each other. Optionally, they can be loosely adjacent to each other, that is to say, the combustion chamber screen 52 is adjacent to the bottom 56, but outside the gas generator 10 it could be easily removed from the end cap 54 without deformation of one of the parts.

As an alternative, the peripheral edge 58 is bent slightly inwardly and is urged against the combustion chamber screen 52.

The end cap 54 is made of sheet metal and includes no flow orifices.

A pot-shaped filter element 60 is axially connected to the end cap 54 and comprises a filter bottom 62 from the edge of which one or more centering extensions 64 project.

A support member 66 having plural flow orifices abuts on the step 30 and supports the filter element 60 abutting on the latter as well as the end cap 54 abutting in turn on the filter element in the axial direction when gas flows out.

The support member 66 preferably is a metal sheet the bending stiffness of which is higher than that of the end cap 54 and the filter element 60.

The filter element 60 is centered laterally in the housing 12 via the centering extension or extensions 64. The centering extensions 64 or the centering extension extend(s) laterally along the bottom 56 of the end cap 54 and partially laterally of the peripheral edge 58. In this way, again the end cap 54 is laterally centered in the filter element 60.

When activating the gas generator 10, current is supplied to the igniter 18 and ignites the booster charge 22 so that the membrane 28 will tear and hot gas and hot particles will flow into the combustion chamber 44. There, they ignite the fuel pellets 46. Gas, burnt material and slag flow into the interior of the combustion chamber screen 52. As the diffuser-side end thereof is located close to the inside of the housing 12 or terminates with it, substantially the whole gas, burnt material and slag flow into the combustion chamber screen 52. Then filtered combustion gas reaches an annular space 68 between the inside of the housing 12 and the outside of the combustion chamber 44. The cross-section of said annular space 68 increases toward the diffuser-side end, which is of advantage because gas increasingly flows into the annular space 68 in this area.

Via the annular space 68, the combustion gas finally flows into the filter element 60 where slag is deposited. The filtered combustion gas flows into an intermediate chamber 80 delimited between the support member 66 and the taper of the housing and then flows through the opening which was still closed before by the bursting membrane 36 into the diffuser 38 which it leaves via the outflow openings.

FIG. 2 illustrates an embodiment of the filter bottom 62 made of wire mesh in this case. Several wire filaments are axially angled at the edge of the filter bottom 62 and end freely. Those ends of the wires form centering extensions 64.

FIG. 3, on the other hand, illustrates a filter element 60 which is made of knitted wire mesh. Its slightly pot-shaped design may have been imparted to said knitted wire mesh by reshaping the edge of a disk manufactured before, for example. As an alternative, the axially projecting edge defining a peripheral edge and consequently the centering extension 64 is formed when the knitted mesh is manufactured.

FIG. 4 again illustrates a filter element 60 which is preferably made of one single piece of wire in which the wire extends in two planes each being bent in serpentine shape and includes parallel wire sections 82 on an upper plane and wire sections 84 on a lower plane which, when viewed in the axial direction, then extend at right angles to each other. The filter element 60 may also be formed of plural, preferably two, single pieces of wire, wherein the pieces of wire may be appropriately connected, particularly welded, to each other.

At the edge of said grid, the U-shaped ends of the neighboring wire sections are angled in the axial direction while forming the centering extensions 64.

Finally, FIG. 5 illustrates a filter element 60 made of plastically formed expanded metal having a closed circumferential centering extension 64 (interrupted by the slits of the expanded metal only).

The invention claimed is:

1. A gas generator comprising
a housing,
an ignition unit including an igniter,
a combustion chamber filled with pyrotechnical fuel,
a diffuser arranged downstream of the combustion chamber and having at least one outflow opening,
a combustion chamber screen provided in the combustion chamber at the diffuser-side end thereof which has a diffuser-side end and an igniter-side axially opposed end and tapers down from the igniter-side end toward the diffuser-side end, wherein the two axially opposed ends are open, wherein the diffuser-side end of the combustion chamber screen is laterally spaced apart from a housing wall while forming a specifically fuel-free annular space,
an end cap with a front face connected to the diffuser-side end of the combustion chamber screen and closing the diffuser-side end of the combustion chamber screen, the end cap having a bottom and a peripheral edge axially projecting from the bottom which is disposed on the outside of the diffuser-side end of the combustion chamber screen, a pot-shaped filter element connected to the end cap and-including a filter bottom and at least one centering extension axially projecting from the edge of the filter bottom by which the filter element is centered within the housing.

2. The gas generator according to claim 1, further comprising a support member on which the filter bottom abuts and which supports the filter element, the end cap and the combustion chamber screen in the outflow direction.

3. The gas generator according to claim 1, wherein the housing has a step, in particular in the form of a taper, towards the diffuser on which step the support member abuts.

4. The gas generator according to claim 2, wherein an intermediate chamber is formed between the support member and the taper.

5. The gas generator according to claim 2, wherein the support member is a disk provided with flow orifices the bending stiffness of which is higher than that of the end cap and the filter element.

6. The gas generator according to claim 2, wherein the housing is closed by a bursting membrane axially spaced apart from the support member.

7. The gas generator according to claim 2, wherein the support member abuts laterally on the housing so as to be centered within the housing.

8. The gas generator according to claim 1, wherein fuel pellets as well as a mechanical biasing device for biasing the fuel pellets towards the diffuser are disposed in the combustion chamber.

9. The gas generator according to claim 8, wherein the biasing device comprises a disk extending transversely to the longitudinal extension of the combustion chamber and being movable in the combustion chamber as well as a coil spring biasing the disk.

10. The gas generator according to claim 9, wherein the coil spring takes a double taper shape having a tapered central portion.

11. The gas generator according to claim 9, wherein the coil spring is axially spaced apart from the igniter-side end of the housing and is axially held on the housing by a radial press-fit, and/or in that the ignition unit protrudes axially into the coil spring.

12. The gas generator according to claim 1, wherein the gas generator is a tubular gas generator comprising a cylindrical elongate housing at an axial end of which the ignition unit is provided and at the opposite end of which the diffuser is provided.

13. The gas generator according to claim 1, wherein the filter element is made of wire mesh, knitted wire mesh, expanded metal or a grid formed by overlapping wire sections extending transversely to each other.

14. The gas generator according to claim 13, wherein the centering extension is a closed circumferential wall that merges integrally into the filter bottom, or in that plural centering extensions formed by wire sections angled vis-à-vis the filter bottom are provided.

15. The gas generator according to claim 14, wherein the angled wire sections are wire ends or U-shaped wire sections between wire sections extending in parallel.

16. The gas generator according to claim 1, wherein the end cap is delimited laterally to the outside by the peripheral edge and is centered with the peripheral edge laterally in the filter element via the at least one centering extension.

17. The gas generator according to claim 1, wherein the end cap is configured to center itself on diffuser-side end of the combustion chamber screen upon fixation thereto, and wherein the filter element is configured to center itself on the end cap upon fixation thereto.

18. The gas generator according to claim 1, wherein the end cap is configured to fit over the diffuser-side end of the combustion chamber screen with the peripheral edge extending along the outside of the diffuser-side end of the combustion chamber screen, and wherein the filter element is configured to fit over the end cap with the at least one centering extension of the filter element extending along the peripheral edge of the end cap.

* * * * *